(12) United States Patent
Wittlinger et al.

(10) Patent No.: US 6,926,122 B2
(45) Date of Patent: Aug. 9, 2005

(54) BRAKE TORQUE PLATE AND INSTALLATION METHOD

(75) Inventors: Jeffrey R. Wittlinger, Massillon, OH (US); Kenneth C. Leonard, Homeworth, OH (US); Chris A. Redgrave, Canton, OH (US); Jay D. White, Massillon, OH (US); Gary E. Gerstenslager, Canton, OH (US)

(73) Assignee: The Boler Company., Itasca, IL (US)

( * ) Notice: Subject to any disclaimer, the term of this patent is extended or adjusted under 35 U.S.C. 154(b) by 65 days.

(21) Appl. No.: 10/465,400

(22) Filed: Jun. 19, 2003

(65) Prior Publication Data

US 2003/0234518 A1 Dec. 25, 2003

Related U.S. Application Data

(60) Provisional application No. 60/391,300, filed on Jun. 25, 2002.

(51) Int. Cl.[7] .............................................. F16D 65/02
(52) U.S. Cl. .................. 188/18 A; 188/71.1; 188/73.43
(58) Field of Search ............................ 188/73.31, 73.39

(56) References Cited

U.S. PATENT DOCUMENTS

| 4,031,986 A | * | 6/1977 | Thompson .................. 188/72.4 |
| 4,311,216 A | * | 1/1982 | Garrett et al. ............. 188/18 A |
| 6,354,408 B1 | * | 3/2002 | Bailey et al. ............. 188/73.39 |

* cited by examiner

Primary Examiner—Matthew C. Graham
(74) Attorney, Agent, or Firm—Buckingham, Doolittle & Burroughs, LLP.; David P. Dureska; David J. Hrina

(57) ABSTRACT

A brake torque plate and an installation method for fixedly attaching the plate to an axle tube, includes the plate formed with an opening and a continuous cut extending between the plate peripheral edge and the opening, wherein the diameter of the opening is smaller than that of the axle tube. The cut enables the torque plate to be temporarily expanded for installation on the axle tube by spreading means until the bore diameter is larger than that of the axle tube. Upon mounting of the torque plate on the axle tube, the spreading means is removed to reduce the diameter of the opening, thereby creating an interference fit between the torque plate and the axle tube and minimizing or eliminating the gap between the plate opening and the axle tube to ensure perpendicularity between the axle tube center line and the torque plate inboard and outboard faces.

20 Claims, 3 Drawing Sheets

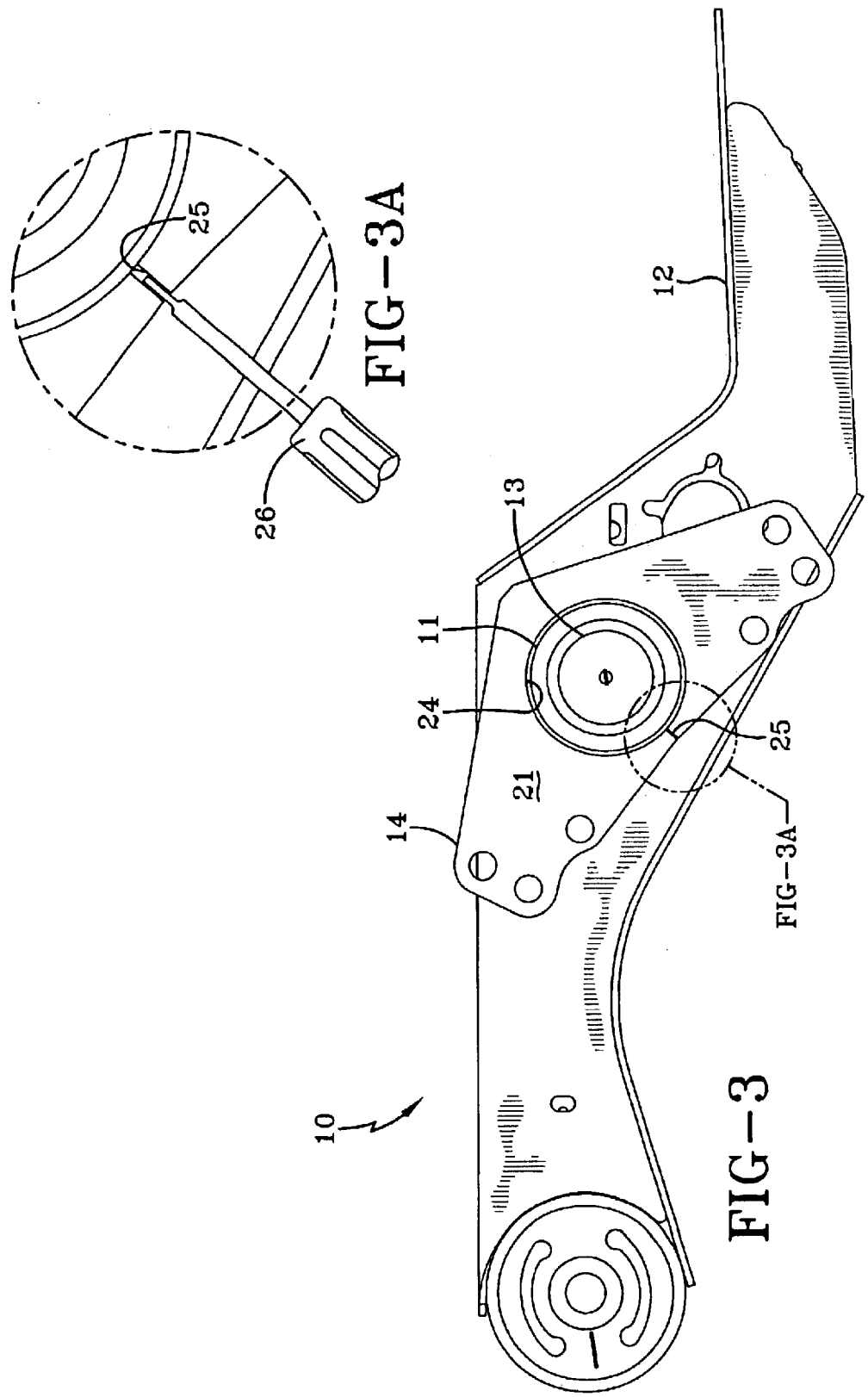

BRAKE TORQUE PLATE AND INSTALLATION METHOD

CROSS-REFERENCE TO RELATED APPLICATION

This application claims the benefit of U.S. Provisional Patent Application Ser. No. 60/391,300, filed Jun. 25, 2002.

BACKGROUND OF THE INVENTION

1. Field of the Invention

The invention relates to a brake torque plate and an installation method for fixedly attaching the torque plate to an axle or axle tube, and in particular to an installation method that minimizes or eliminates the gap between a bore or opening formed in the torque plate and the exterior surface of the axle tube, and that achieves perpendicularity of the inboard and outboard faces of the torque plate to the center line of the axle spindle/axle tube. More particularly, the present invention is directed to a torque plate having a bore or opening and a cut extending continuously between the torque plate peripheral edge and the bore, wherein the cut allows the torque plate bore to be temporarily expanded during installation of the torque plate on the axle. Upon successful slideable mounting of the torque plate about the axle tube, the cut is reduced or eliminated to create an interference fit between the torque plate and the axle tube, thereby reducing or eliminating the gap between the torque plate bore and the axle tube and ensuring perpendicularity between the torque plate faces and the axle centerline.

2. Background Art

Disc braking systems are well-known in the brake art and operate by squeezing a pair of opposing pads, via a caliper assembly, against a rotor, thereby creating friction between the contacting surfaces and enabling slowing and stopping of the vehicle on which the disc braking system is installed. Specifically, the caliper slides on guide pins which are incorporated into a caliper carrier. The caliper carrier typically is mounted on a plate, hereinafter referred to as a torque plate, that serves not only to resist torque generated during braking, but also to hold the caliper assembly square to the rotor to facilitate efficient braking.

Field and laboratory testing has shown that if the caliper, brake pads, and/or guide pins are not mounted and maintained square to the rotor, then premature failure of these components can occur. For example, uneven brake pad wear, guide pin binding that can cause chatter, and in some cases cracking of the rotor or caliper, are all problems that can occur.

To achieve the desired results of efficient brake operation in a disc braking system, it has become industry practice to provide means to mount and maintain the inboard and outboard faces or surfaces of the torque plate perpendicular to the center line of the axle spindle to a tolerance of less than 0.020 inches.

One means heretofore used for holding such a close tolerance has been to forge the torque plate and axle spindle as a single piece, finish machine the integral structure in one chucking, and then join the axle spindle/torque plate to the axle tube. Although this method of manufacture and assembly is very accurate, it is not practical for use with certain types of axle/suspension systems, such as the patented INTRAAX® axle/suspension system manufactured and sold by the assignee of the present invention, The Boler Company (U.S. Pat. No. 5,366,237). More particularly, an INTRAAX® axle/suspension system incorporates a trailing arm which completely surrounds the axle tube and is welded thereto around the entire circumference of the axle tube. Thus, during installation, this type of trailing arm must be slid over the axle tube before any brake hardware can be attached to the axle, making the one-piece torque plate/axle spindle structure and installation method impractical.

One known alternative to the one-piece axle spindle/torque plate structure, and in particular for applications where the axle/suspension system arm must be slid onto the axle tube prior to installation of the brake equipment, is a torque plate that has been fabricated independent of the axle spindle. The torque plate and axle spindle then are welded to the axle tube separately after installation of the suspension arm. In particular, the torque plate mating area on the axle tube is machined co-axial to the axle spindle center line, and the torque plate bore is pre-machined perpendicular to the plate faces. This process provides a slip fit of the torque plate on the axle tube to a tolerance of less than 0.015 inches between the torque plate and the axle tube before tacking and subsequent friction welding of the plate on the tube. However, due to the nature of such fabrication and assembly, there is a built-in variation in torque plate to spindle center line perpendicularity, as compared to the one-piece axle spindle/torque plate design described hereinabove. Thus, additional or secondary processing is required after welding the torque plate to the axle tube, such as by machining or straightening. Such secondary processing results in increased costs, which is undesirable.

In studying the causes of the variation in torque plate face to axle spindle center line perpendicularity, it has been proven that the gap between the torque plate and the axle tube has the greatest effect on perpendicularity. Therefore, a more effective design would minimize or eliminate the gap between the mating surfaces of the torque plate and the axle tube. Such a minimization or elimination of the gap could be accomplished by using a press or a shrink fit, but the machining tolerances required for such processes are even more costly than the secondary processing described immediately above. Thus, the need has existed for an efficient structure and method for installing a torque plate on an axle tube resulting in virtually no gap between the torque plate and the axle tube in order to maintain perpendicularity between the inboard and outboard faces of the torque plate and the axle spindle center line.

The present invention solves the above-noted problems through the addition of a continuous cut or opening in the torque plate which extends between the torque plate peripheral edge and the bore, thus allowing the torque plate bore to be temporarily expanded during installation of the torque plate on an axle tube and, upon installation, reduced to create an interference fit between the torque plate and the axle tube, thereby minimizing or eliminating the gap between the torque plate bore and the axle tube to ensure a perpendicular fit.

SUMMARY OF THE INVENTION

Objectives of the present invention include providing an improved disc brake torque plate and a method of installing the plate on an axle tube, which results in the minimization or elimination of the gap between the torque plate bore and the axle tube to achieve and maintain intimate contact therebetween and perpendicularity of the inboard and outboard faces of the torque plate to the axle spindle center line.

A further objective of the present invention is to provide such an improved torque plate that can be efficiently and securely attached to an axle tube without secondary processing.

Yet another objective of the present invention is to provide such an improved torque plate having adequate torsion strength required during operation of the vehicle on which it is mounted. wear, chatter, and/or cracking of the rotors or calipers.

These objectives and advantages are obtained by the disc brake torque plate and installation method of the present invention, the general nature of which may be stated as including, an improved torque plate for an axle, said axle having an exterior surface, and comprising an inboard face, an outboard face and a peripheral edge, a continuous bore shaped complementarily to the exterior surface of said axle and formed in and extending through said torque plate faces, said bore being perpendicular to the faces, and a continuous cut formed in and extending between said peripheral edge and said bore, so that the size of the bore is generally greater than the exterior surface of the axle to create clearance for mounting of said torque plate on the axle, then reduced so that the torque plate maintains intimate mounting contact with said axle when said torque plate is immovably mounted on the axle.

BRIEF DESCRIPTION OF THE DRAWINGS

The preferred embodiment of the present invention, illustrative of the best mode in which applicants have contemplated applying the principles, is set forth in the following description and is shown in the drawings, and is particularly and distinctly pointed out and set forth in the appended claims.

FIG. 3 is a side view of the trailing arm axle/suspension system shown in FIG. 1, including an inset illustrating the continuous cut extending between the inventive torque plate peripheral edge and the bore.

FIG. 3A is an exploded view of the continuous cut extending between the inventive torque plate peripheral edge and the bore shown in FIG. 3.

Similar numerals refer to similar parts throughout the drawings.

DESCRIPTION OF THE PREFERRED EMBODIMENT

Figure 1:
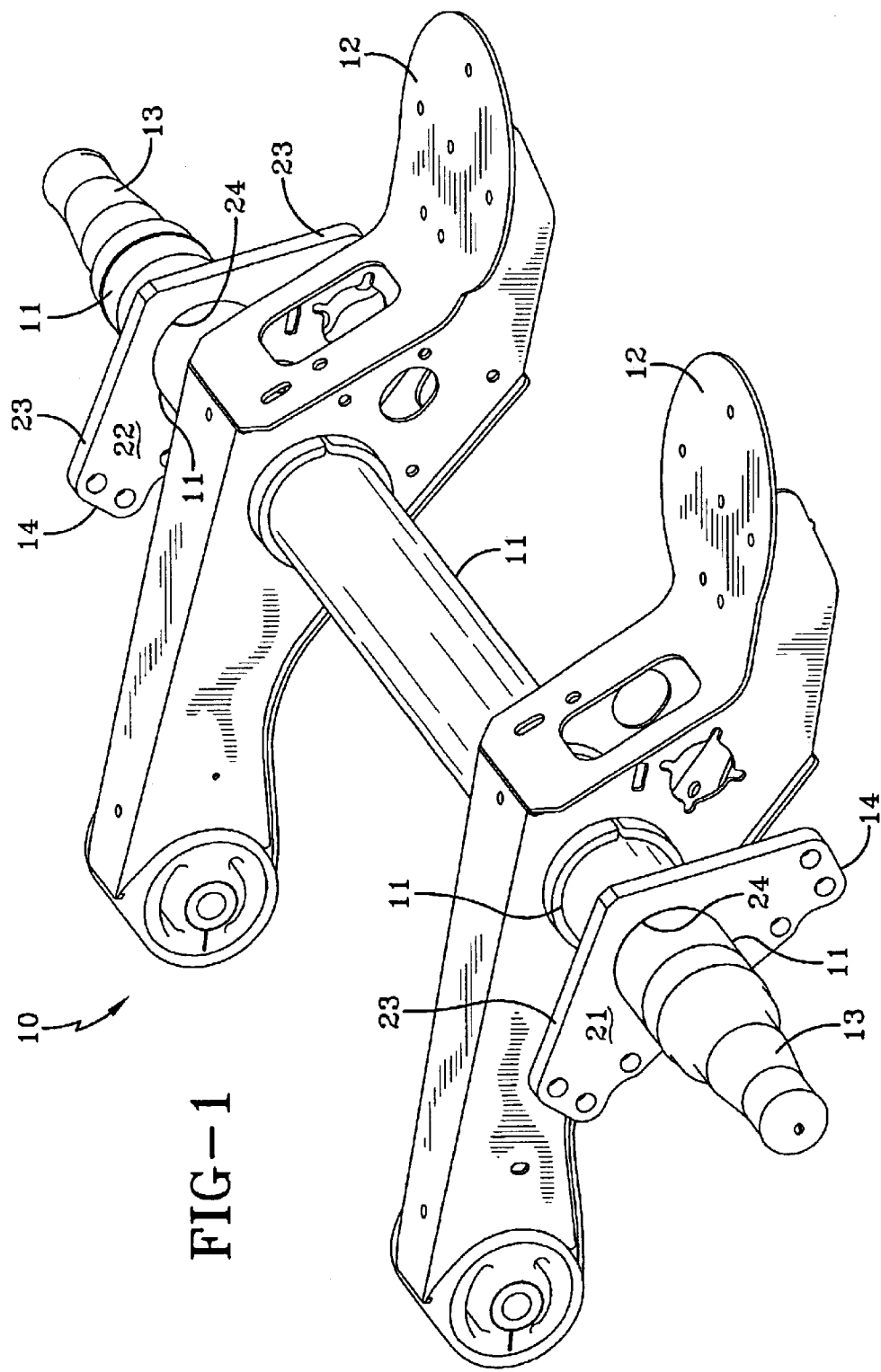
FIG. 1 is a perspective view of a trailing arm axle/suspension system, showing a pair of spaced apart disc brake torque plates of the present invention installed on the axle tube.

The objectives of the present invention are achieved in the following manner. A trailing arm axle/suspension system 10 of the type useful with the present invention is shown generally in FIG. 1. Axle/suspension system 10 is of a type commonly known in the art and includes an axle tube 11, a pair of trailing arms 12, a pair of axle spindles 13, a pair of torque plates 14 of the present invention, a pair of brake assemblies 15 (not shown), and a pair of wheel rotors 16 (not shown). Unless otherwise noted, all components of axle/suspension system 10 preferably are formed of a durable metal such as steel.

Each one of the pair of trailing arms 12 is spaced apart along axle tube 11 and attached thereto by a method well known in the art such as welding. Similarly, each one of the pair of axle spindles 13 is fixedly attached to a respective one of the ends of axle tube 11 by any suitable means, such as welds. Each one of the torque plates 14 is mounted on axle tube 11 outboard of and spaced apart from a respective one of arms 12, wherein the structure of and installation method for the torque plate will be described in detail hereinbelow.

Figure 2:
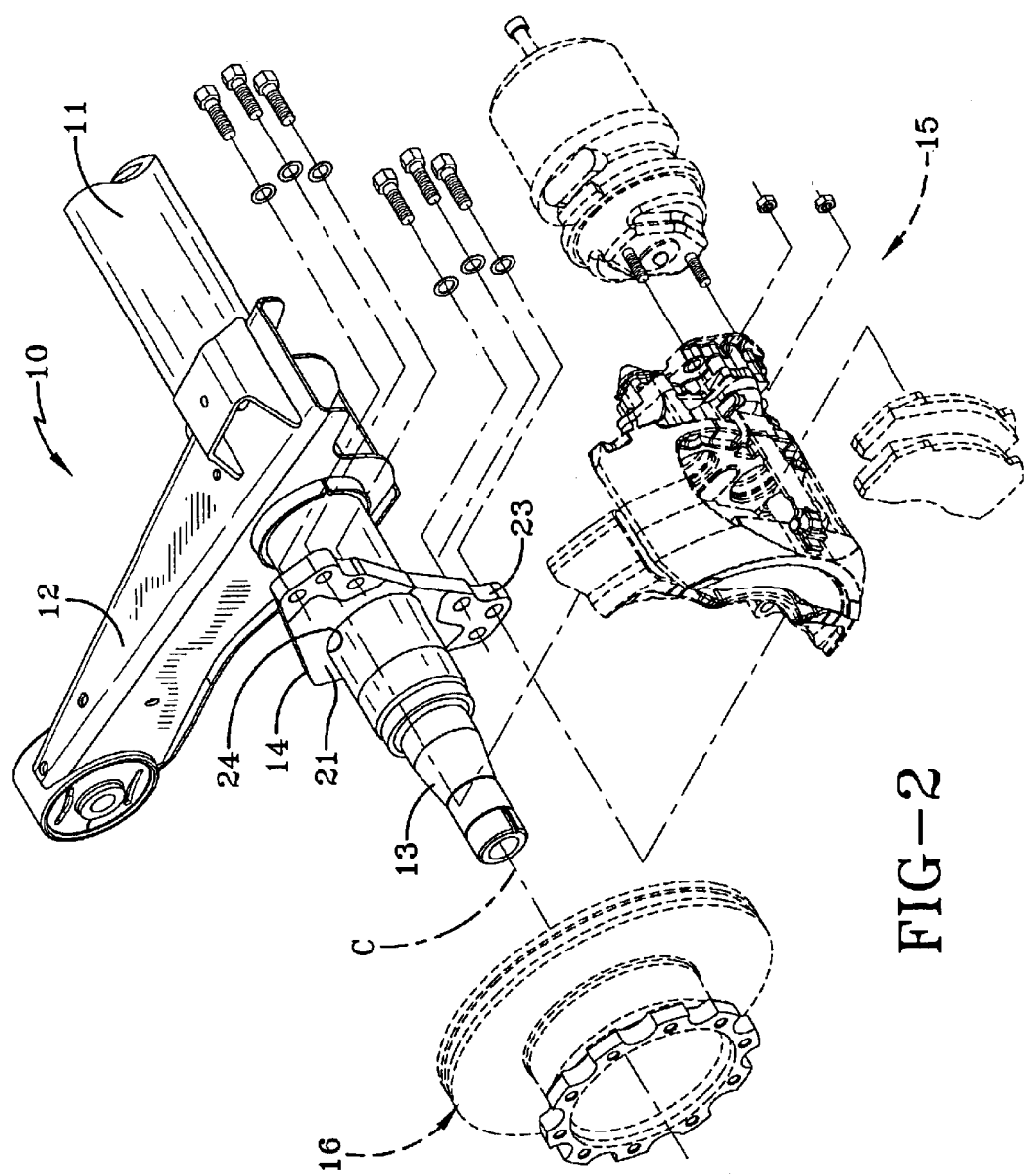
FIG. 2 is a fragmentary perspective view of the left-hand portion of the trailing arm axle/suspension system of FIG. 1, and showing in broken lines an exploded view of the brake assembly and wheel rotor.

As best shown in FIG. 2, each brake assembly 15 is removably attached to a respective one of torque plates 14 by any suitable means, such as fasteners (not shown). Similarly, each rotor 16 is removably attached to a wheel hub (not shown), which in turn is movably attached to a respective one of axle spindles 13 by means well-known in the art, and is permitted to rotate about the centerline C of axle spindle 13 when the vehicle to which it is attached (not shown) is in motion.

In accordance with an important feature of the present invention, each torque plate 14 comprises an outboard surface or face 21, an inboard surface or face 22, and a peripheral edge 23. Each torque plate 14 also is formed with a bore 24 which extends continuously through torque plate 14, and is pre-machined perpendicular to outboard and inboard faces 21, 22. The diameter of bore 24 preferably is smaller than the outside diameter of axle tube 11, thereby creating an interference fit between torque plate 14 and axle tube 11 upon installation, as described more fully below. Notwithstanding, the present invention also contemplates bore 24 having a diameter that is equal to or slightly larger than the outside diameter of axle tube 11, without affecting the overall concept of the present invention.

In accordance with an important feature of the present invention, each torque plate 14 further is formed with a cut or opening 25 which extends continuously between peripheral edge 23 of the torque plate and bore 16, as best illustrated in FIG. 3. Continuous cut or opening 25 enables bore 24 of torque plate 14 to be expanded by spreading means, such as a screwdriver 26, as described in detail below, to a diameter larger than the outside diameter of axle tube 11 either before or as torque plate 14 is being mounted on the axle tube.

An optional key (not shown) could also be used to spread cut 25 for installing torque plate 14 on axle tube 11, also as described more fully below. It is contemplated that key could be made of a consumable material, such as aluminum, that will disintegrate or melt during welding, thereby causing torque plate 14 to clamp to axle tube 11.

Having described improved torque plate 14 of the present invention, the method for installing the torque plate on axle tube 11 now will be described in detail. Following the successful installation of trailing arms 12 on axle tube 11 by means commonly known in the art and either before or after the successful installation of each one of axle spindels 13 to a respective one of the ends of axle tube 11, improved torque plate 14 is ready for installation.

A spreading device, such as a spreading tool like screwdriver 26 or a wedge, is used to spread or increase the size of cut 25, thereby increasing the diameter of bore 24, to permit torque plate 14 to be slid over the end of axle tube 11 and into the desired position along the axle tube. Importantly, it is contemplated that the spreading device could be any one of a number of different mechanical devices, and is not limited to those specifically referenced herein.

Once improved torque plate 14 is located at the desired position along axle tube 11 the outer surface of which has been machined co-axial to the axle tube and the axle spindle centerline C, the spreading device is removed and the mismatch of smaller diameter torque plate bore 24 and the larger outside diameter of axle tube 11 causes the torque plate to remain in a deflected state. This deflection generates a clamping force or interference fit that maintains intimate contact between torque plate 14 and axle tube 11. Cut 25 then can be welded together, and as the weld cools and shrinks, the base metal of torque plate 14 draws even closer together and further clamps the torque plate to axle tube 11. Torque plate 14 then can be welded to axle tube 11 around the axle tube circumference, thereby giving the torque plate the torsion strength required during operation of the braking system of the vehicle on which it is mounted. No tack welding is required to hold the parts in place before welding, and no secondary processing is required to maintain perpendicularity of the outboard and inboard faces 21, 22 of torque plate 14 to centerline C of axle spindle 13 and axle tube 11. The structure of torque plate 14 and installation method of the present invention also requires an installation force much lower than a traditional press fit.

It is understood that the present invention contemplates other methods and structures for minimizing or eliminating the gap between torque plate bore 24 and axle tube 11 to achieve and maintain intimate contact therebetween and perpendicularity of the torque plate faces 21, 22 to axle centerline C. Examples of such alternative structures and methods include simulating a band clamp by over sizing torque plate bore 24 and drawing torque plate 14 together mechanically, or staking the parts together before welding by displacing material from torque plate 14 that would force intimate contact between the plate and axle tube 11.

Thus, it can be seen that the present invention reduces or eliminates the gap between torque plate bore 24 and axle tube 11 and achieves perpendicularity between faces 21, 22 of torque plate 14 and the centerline of axle spindle 13. More particularly, improved torque plate 14 reduces or eliminates the problems of uneven brake wear, excessive chatter, and/or cracking or rotors or calipers, all of which can be caused by a gap between torque plate bore 24 and axle tube 11.

The present invention is intended for use with axle/suspension systems which require that a trailing arm, or other part, be installed inboard and prior to the installation of the torque plate. Notwithstanding, it is contemplated that the improved torque plate and installation method of the present invention could also be used on any axle/suspension system, including but not limited to those having leading arms, or drum braking systems, or those of an automobile, that requires a torque plate. It is also contemplated that the torque plate of the present invention could be used on axles that are not tubular or circular, such as those axles having a square, rectangular or some other shape for a cross-section, either hollow or not, it being understood that the bore would then be complementary shaped to the shape of the axle.

Accordingly, the improved brake torque plate and installation method is simplified, provides an effective, safe, inexpensive and efficient structure and method which achieves all the enumerated objectives, provides for eliminating difficulties encountered with prior fixtures and methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the invention is by way of example, and the scope of the invention is not limited to the exact details shown or described.

Moreover, the description and illustration of the invention is by way of example, and the scope of the invention is not limited to the exact details shown or described.

Having now described the features, discoveries and principles of the invention, the manner in which the improved torque plate is used and installed, the characteristics of the construction, arrangement and method steps, and the advantageous, new and useful results obtained; the new and useful structures, devices, elements, arrangements, process, parts and combinations are set forth in the appended claims.

What is claimed is:

1. An improved torque plate for an axle, said axle having an exterior surface, said torque plate comprising:
    a) an inboard face, an outboard face and a peripheral edge;
    b) a continuous opening formed in and extending through said torque plate faces, said opening being complementarily shaped to said axle exterior surface and perpendicular to the faces; and
    c) a continuous cut formed in and extending between said peripheral edge and said opening, so that the dimensions of the opening are generally greater than the axle exterior surface dimensions to create clearance for positioning said torque plate on the axle, said torque plate opening dimensions subsequently being reduced to immovably mount the torque plate on the axle, whereby the torque plate maintains intimate mounting contact with said axle.

2. The improved torque plate of claim 1 wherein said axle is tubular.

3. The improved torque plate of claim 1 wherein said cut is configured to receive a key.

4. The improved torque plate of claim 3 wherein said key is wedge shaped.

5. The improved torque plate of claim 2 wherein said axle has an outside diameter and said opening has a diameter, wherein the diameter of the opening is smaller than the outside diameter of the axle.

6. The improved torque plate of claim 2 wherein said axle has an outside diameter and said opening has a diameter, wherein the diameter of the opening is equal to the outside diameter of the axle.

7. The improved torque plate of claim 2 wherein said axle has an outside diameter and said opening has a diameter, wherein the diameter of the opening is greater than the outside diameter of the axle.

8. The improved torque plate of claim 1 wherein said exterior surface of the axle is co-axial to a centerline of the axle.

9. A method for mounting an improved torque plate on an axle, said axle having an exterior surface and said torque plate comprising an inboard face, an outboard face, a peripheral edge, a continuous opening formed in and extending through said torque plate faces, said opening being perpendicular to the faces and complementary shaped to the exterior surface of said axle, and a continuous cut formed in and extending between said peripheral edge and said opening, said method comprising the steps of:
    a) positioning said torque plate about said axle at a location where the exterior surface of the axle is coaxial to the centerline of the axle, said opening dimensions being generally larger than said axle exterior surface dimensions during positioning;
    b) reducing the cut, whereby the dimensions of the opening are reduced to enable the torque plate to maintain intimate contact with the axle; and
    c) immovably attaching said torque plate to said axle.

10. The method of installing an improved torque plate on an axle of claim 9 further comprising the step of welding the cut together.

11. The method of installing an improved torque plate on an axle of claim 9 wherein said spreading means is a screwdriver.

12. The method of installing an improved torque plate on an axle of claim 9 further comprising the step of inserting a key in said cut.

13. The method of installing an improved torque plate on an axle as in claim 12, wherein said key is wedge shaped and consumed when heated.

14. The method of installing an improved torque plate on an axle as in claim 12, wherein said key is made of aluminum.

15. The method of installing an improved torque plate on an axle of claim 9 wherein improved torque plate is immovably attached to the axle through welding.

16. The method of installing an improved torque plate on an axle of claim 9 wherein said torque plate is formed of steel.

17. The method of installing an improved torque plate on an axle of claim 9 wherein said spreading means is a wedge.

18. The method of installing an improved torque plate on an axle of claim 9 wherein said spreading means is a mechanical device.

19. The method of installing an improved torque plate on an axle of claim 9 wherein said cut is reduced or eliminated by removing the spreading means.

20. The method of installing an improved torque plate on an axle of claim 9 wherein said cut is reduced or eliminated by a band clamp.

* * * * *